(12) United States Patent
Morris

(10) Patent No.: US 7,063,126 B1
(45) Date of Patent: Jun. 20, 2006

(54) HEAT EXCHANGE ASSEMBLY

(76) Inventor: Geoffrey R Morris, P.O. Box 35, Bemboka, NSW (AU) 2550

( * ) Notice: Subject to any disclaimer, the term of this patent is extended or adjusted under 35 U.S.C. 154(b) by 0 days.

(21) Appl. No.: 09/674,256

(22) PCT Filed: Apr. 28, 1999

(86) PCT No.: PCT/AU99/00320

§ 371 (c)(1),
(2), (4) Date: Dec. 22, 2000

(87) PCT Pub. No.: WO99/55984

PCT Pub. Date: Nov. 4, 1999

(30) Foreign Application Priority Data

Apr. 29, 1998 (AU) .................................. PP3292

(51) Int. Cl.
*E04D 13/18* (2006.01)
*F24J 2/20* (2006.01)
*F28F 3/12* (2006.01)

(52) U.S. Cl. ..................... 165/53; 165/140; 165/170; 126/621; 126/623; 126/664; 126/669; 126/674; 126/678

(58) Field of Classification Search ............... 165/170, 165/53, 140; 126/678, 674, 621, 623, 664, 126/669
See application file for complete search history.

(56) References Cited

U.S. PATENT DOCUMENTS

| 2,571,631 | A | * | 10/1951 | Trumpler | |
|---|---|---|---|---|---|
| 3,918,430 | A | * | 11/1975 | Stout et al. | 165/170 |
| 4,060,072 | A | * | 11/1977 | Johnson | 165/170 |
| 4,089,324 | A | * | 5/1978 | Tjaden | 165/170 |
| 4,098,331 | A | * | 7/1978 | Ford et al. | 165/170 |
| 4,114,597 | A | | 9/1978 | Erb | |
| 4,150,720 | A | * | 4/1979 | Brackman | 165/170 |
| 4,263,896 | A | * | 4/1981 | Zebuhr | 165/170 |
| 4,382,468 | A | * | 5/1983 | Hastwell | 165/170 |
| 4,898,153 | A | * | 2/1990 | Sherwood | 165/170 |
| 5,242,015 | A | * | 9/1993 | Saperstein et al. | 165/164 |
| 6,014,967 | A | * | 1/2000 | Rekstad et al. | 126/678 |
| 6,082,354 | A | * | 7/2000 | Rekstad | 126/674 |
| 6,173,767 | B1 | * | 1/2001 | Kennon | 165/278 |
| 6,216,688 | B1 | * | 4/2001 | Schwarz | 126/678 |

FOREIGN PATENT DOCUMENTS

| AU | B-68020/98 | | 9/1998 | |
|---|---|---|---|---|
| DE | 150655 | * | 7/1901 | ................. 167/170 |
| DE | 2543326 | * | 4/1977 | |

(Continued)

*Primary Examiner*—John K. Ford
(74) *Attorney, Agent, or Firm*—David C. Jenkins; Arnold B. Silverman; Eckert Seamans Cherin & Mellott, LLC

(57) ABSTRACT

A roofing panel (13) incorporating a heat exchange assembly is described, the roofing panel including: an internal fluid passageway (51) formed between a pair of spaced substantially parallel internal sheets (16, 17) for the passage therethrough of a fluid; respective external passageways (52, 53) formed between each internal sheet and a respective external sheet (21, 20) spaced from and substantially parallel to a respective internal sheet, and spacing ribs (18, 22, 24) between the sheets and forming with the sheets a plurality of fluid conduits (19) within the fluid passageway and a plurality of external conduits (23, 25) within the external passageways; wherein the panel is sealed at the sides thereof by the spacing ribs and is open at the ends thereof to provide access to the conduits which extend from one end of the panel to the other end thereof.

3 Claims, 5 Drawing Sheets

FOREIGN PATENT DOCUMENTS

| | | | | |
|---|---|---|---|---|
| DE | 3129599 | * | 2/1983 | ................ 165/170 |
| DE | 3310738 | * | 9/1984 | ................ 165/170 |
| DE | 1183520 | * | 3/1985 | |
| GB | 1042732 | * | 2/1963 | |
| JP | 0202084 | * | 9/1986 | ................ 165/140 |
| WO | WO 89/054333 | | 6/1989 | |

* cited by examiner

HEAT EXCHANGE ASSEMBLY

TECHNICAL FIELD

This invention relates to a heat exchange assembly and to a method of heat exchange.

The invention has particular but not exclusive application to heat exchangers for use in a roof and to solar heat exchangers, although the invention may be utilised in other than roofing systems and in other than solar powered systems.

BACKGROUND OF INVENTION

Heat exchange assemblies are known in which a roofing panel is comprised of a pair of spaced apart polycarbonate sheets and in which water is heated as it flows between the sheets. International patent application PCT/NO95/00127 in the name of Rekstad illustrates such a system.

SUMMARY OF INVENTION

The present invention aims to provide an alternative to known heat exchange assemblies, known methods of heat exchange and known roofing panels incorporating a heat exchange assembly.

This invention in one aspect resides broadly in a heat exchange assembly including:— an internal passageway formed between a pair of spaced substantially parallel internal sheets, and respective external passageways formed between each said internal sheet and a respective external sheet spaced from and substantially parallel to a respective internal sheet;

said pair of internal sheets at the ends of said internal passageway extending beyond said external sheets at the ends of said external passageways thereby facilitating fusion welding to said internal sheets at the ends of said internal passageway.

Although the invention is described with reference to the preferred embodiments as having one internal fluid passageway formed between a pair of spaced substantially parallel internal sheets, it is to be understood that there may be a plurality of internal passageways formed between respective pairs of spaced substantially parallel internal sheets. Thus the heat exchange assembly may include more than four sheets.

The sheets can be separated by any suitable spacing means such as posts or the like. However it is preferred that the heat exchange assembly includes:— spacing ribs between said sheets and forming with said sheets a plurality of fluid conduits within said internal passageway and a plurality of external conduits within said external passageways.

Preferably the heat exchange assembly includes:— fluid inlet means at one end of said internal passageway or said external passageways for the inflow of fluid in the heat exchange assembly, and fluid outlet means at the other end of said internal passageway or said external passageways for the outflow of fluid from the heat exchange assembly.

The external passageways can contain another liquid however it is preferred that the heat exchange assembly includes:— gas inlet means at one end of the other of said internal passageway or said external passageways for the inflow of gas to the heat exchange assembly, and gas outlet means at the other end of the other of said internal passageway or said external passageways for the outflow of gas from the heat exchange assembly;

whereby said internal passageway or said external passageways is/are adapted to receive or contain a gas for effecting heat exchange with a fluid in the other of said internal passageway or said external passageways.

The gas can be air whereby the external passageways comprise an open system. Alternatively in a closed system the gas can be an inert gas.

The heat exchange assembly can be of any suitable shape and configuration consistent with the above. However it is preferred that the heat exchange assembly constitutes a panel sealed at the sides thereof by said spacing ribs and open at the ends thereof to provide access to said conduits which extend from one end of the panel to the other end thereof.

Preferably the panel is suitable for use as roofing.

Accordingly in another aspect this invention resides broadly in a roofing panel incorporating a heat exchange assembly, said roofing panel including:— an internal fluid passageway formed between a pair of spaced substantially parallel internal sheets for the passage therethrough of a fluid;

respective external passageways formed between each said internal sheet and a respective external sheet spaced from and substantially parallel to a respective internal sheet, and spacing ribs between said sheets and forming with said sheets a plurality of fluid conduits within said fluid passageway and a plurality of external conduits within said external passageways;

said pair of internal sheets at the ends of said internal passageway extending beyond said external sheets at the ends of said external passageways thereby facilitating fusion welding to said internal sheets at the ends of said internal passageway, said panel being sealed at the sides thereof by said spacing ribs and being open at the ends thereof to provide access to said conduits which extend from one end of the panel to the other end thereof.

Fluid and or gas supplies may be connected directly to the respective conduits at the ends of the panel. However it is preferred that the heat exchange assembly includes an inlet manifold and an outlet manifold at respective ends of the panel.

Preferably the inlet manifold and the outlet manifold include the fluid inlet means and the fluid outlet means respectively. The inlet manifold and the outlet manifold also preferably include the gas inlet means and the gas outlet means respectively.

The heat exchange assembly may also include pressure relief means for relieving the pressure in the fluid passageway generated by heating fluid therein. In a preferred embodiment the relief means is a riser positioned in the fluid inlet and/or fluid outlet means.

In another aspect this invention resides broadly in a heat exchange assembly including:— an internal passageway formed between a pair of spaced substantially parallel internal sheets, and respective external passageways formed between each said internal sheet and a respective external sheet spaced from and substantially parallel to a respective internal sheet;

fluid inlet means at one end of said internal passageway or said external passageways for the inflow of fluid in the heat exchange assembly;

fluid outlet means at the other end of said internal passageway or said external passageways for the outflow of fluid from the heat exchange assembly;

gas inlet means at one end of the other of said internal passageway or said external passageways for the inflow of gas to the heat exchange assembly, and gas outlet means at the other end of the other of said internal passageway or said external passageways for the outflow of gas from the heat exchange assembly;

whereby said internal passageway or said external passageways is/are adapted to receive or contain a gas for effecting heat exchange with a fluid in the other of said internal passageway or said external passageways.

In another aspect this invention resides broadly in a manifold for connection to a panel as defined above, the manifold including:— fluid communication means for the inflow or outflow of fluid to or from the fluid conduits, and gas communication means for the inflow or outflow of gas to or from the external conduits.

The manifold can be connected to the panel in a number of ways. It could for example be a split tube adapted to be retained on ends of the panel by the resilience of the split tube. Alternatively the manifold can be ultrasonically welded to the panel. In a preferred embodiment the manifold includes receiving means for receiving the internal sheets and the external sheets whereby the fluid communication means and the gas communication means are sealingly connected to the fluid passageway and the external passageways respectively.

It is preferred that the manifold is an extrusion and the fluid communication means and the gas communication means are channels in the extrusion.

In a further aspect this invention resides broadly in a heat exchange panel including:— an internal fluid passageway formed between a pair of spaced substantially parallel internal sheets for the passage therethrough of a fluid;

respective external passageways formed between each the internal sheet and a respective external sheet spaced from and substantially parallel to a respective internal sheet, spacing ribs between the sheets and forming with the sheets a plurality of fluid conduits within the fluid passageway and a plurality of external conduits within the external passageways, and manifold means including fluid communication means for the inflow or outflow of fluid to or from the fluid conduits, and gas communication means for the inflow or outflow of gas to or from the external conduits;

wherein the panel is sealed at the sides thereof by the spacing ribs and is open at the ends thereof to provide access to the conduits which extend from one end of the panel to the other end thereof.

DESCRIPTION OF DRAWINGS

In order that this invention may be more easily understood and put into practical effect, reference will now be made to the accompanying drawings which illustrate a preferred embodiment of the invention, wherein:—

DESCRIPTION OF PREFERRED EMBODIMENT OF INVENTION

Figure 1:
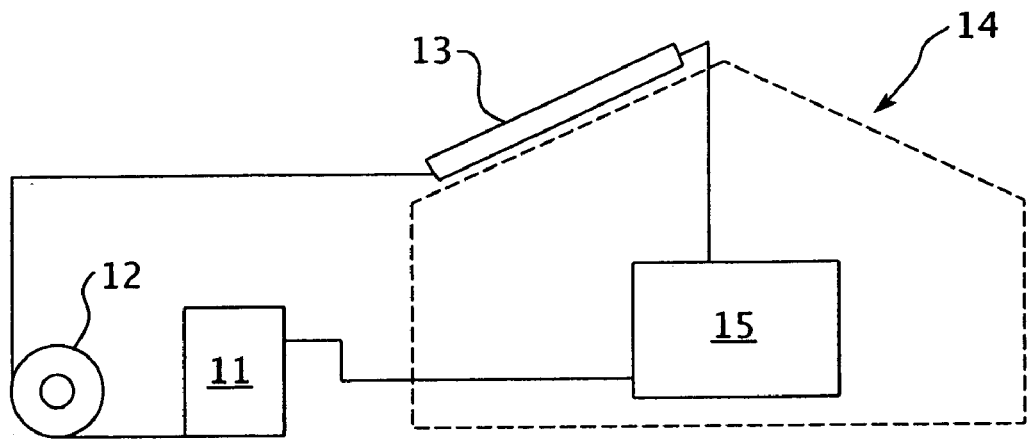
FIG. 1 is a schematic illustration of the heat exchanger of the present invention in use.

As can be seen in FIG. 1, water is pumped from a water storage tank 11 by pump 12 to a heat exchanger 13 positioned on the roof of house 14. The heated water is then utilised by systems 15 and returned to tank 11. It is to be understood that this diagrammatic illustration is merely representative. The heat exchanger need not be located on a roof and can be positioned for solar operation at an appropriate angle of inclination on the ground or on a free standing support frame. Neither as will be obvious from a full reading of the specification, need the operative energy source be solar. Neither are the uses to which the heat exchanger can be put be limited to a house, and these uses can be varied.

Typical uses include underfloor or in-slab heating, greenhouse heating, swimming pool heating and hot water systems. However it is to be understood that the heat exchanger of the present invention is not limited to heating and can be used in cooling systems. However for illustrative purposes the following description will relate to a heat exchanger included in a panel suitable for roofing a house.

Figure 2:
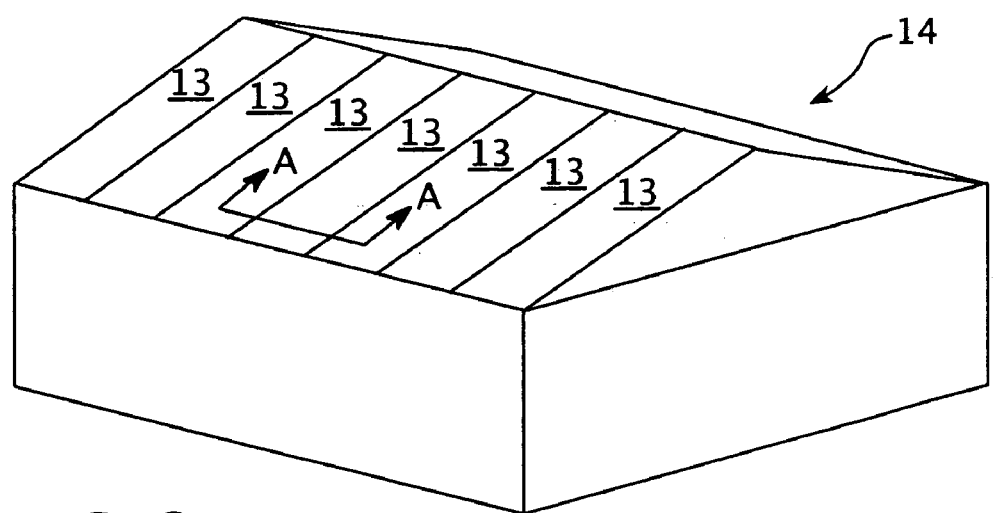
FIG. 2 is a schematic illustration showing roofing panels in accordance with the present invention positioned on a roof.

As can be seen in FIG. 2, a plurality of roofing panels 13 are positioned side by side to constitute the roof on that side of the roof of dwelling 14 receiving most direct sunlight. The panels are preferably the standard width between roof trusses ie 900 mm and of variable length. The panels can also be made to a standard length, ie 12 mm, and can be cut to size to suit individual roofing requirements.

Figure 3:
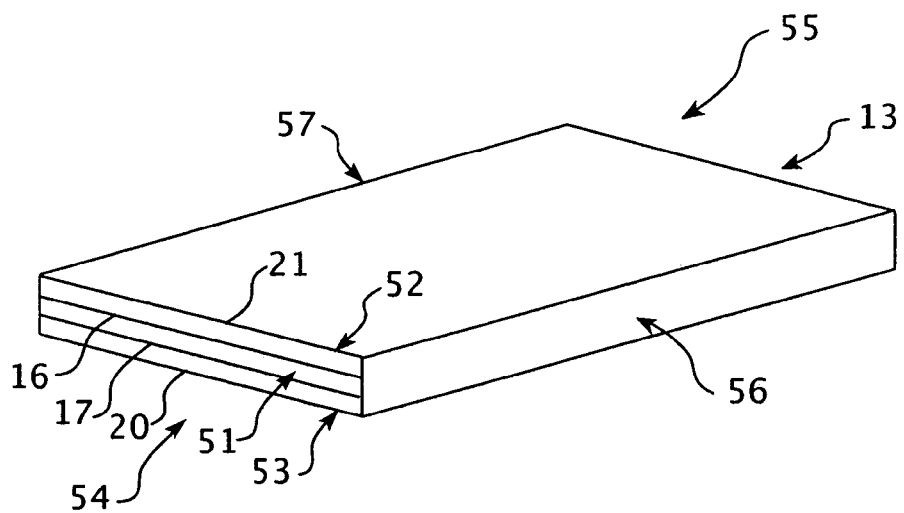
FIG. 3 is a generalised perspective view of a heat exchanger panel in accordance with the present invention.

As is seen generally in FIG. 3, panel 13 has open ends 54 and 55 providing communication with a central passageway 51 sandwiched between external passageways 52 and 53. The passageways are formed between internal sheets 16 and 17 and external sheets 20 and 21. Panel 13 is sealed along lateral side edges 56 and 57.

Figure 4:
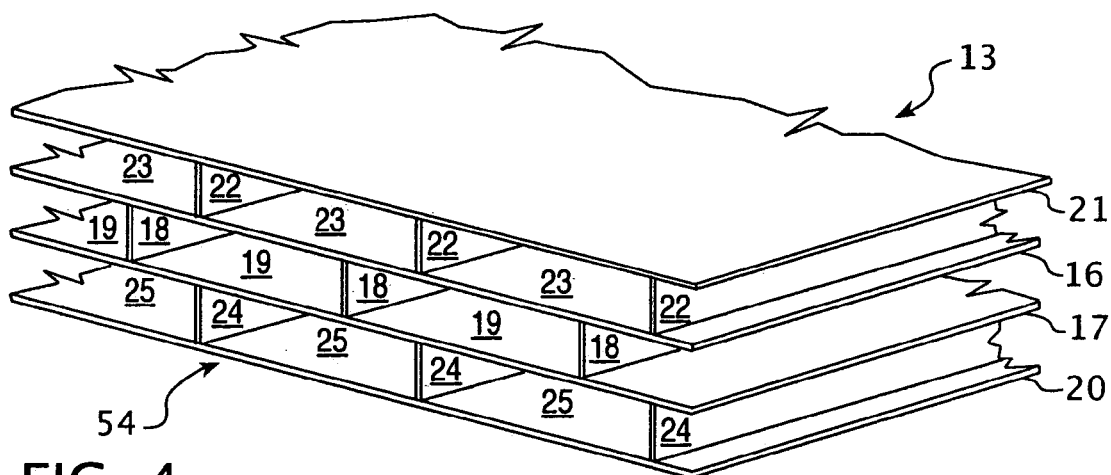
FIG. 4 is a detailed partial perspective view of a the heat exchanger panel of FIG. 3.

The detailed construction of each roofing panel is best seen in FIG. 4. Internal fluid passageway 51 is formed between a pair of spaced substantially parallel internal sheets 16 and 17 for the passage therethrough of a fluid, and the external passageways 52 and 53 are formed respectively between internal sheets 16 and 17 and a external sheets 21 and 20 which are spaced from and substantially parallel to respective internal sheets 16 and 17.

Spacing ribs 18 are located between internal sheets 16 and 17 and form with the internal sheets a plurality of fluid conduits 19 within fluid passageway 51. Spacing ribs 22 are located between internal sheet 16 and external sheet 21 and form with the sheets a plurality of external conduits 23 within external passageway 52. Similarly, spacing ribs 24 are located between internal sheet 17 and external sheet 20 and form with the sheets a plurality of external conduits 25 within external passageway 53.

Panels 13 can be made from a suitable plastics material such as known temperature resistant plastic polycarbonate. The material may be translucent of tinted on one or both external sheets for aesthetic purposes or for increasing the effectiveness of solar absorption. Alternatively, panels 13 can be made from suitable metal material such as aluminium or rolled steel which may be powder coated on the outside of the external sheets to provide desired colouring effects.

Figure 5:
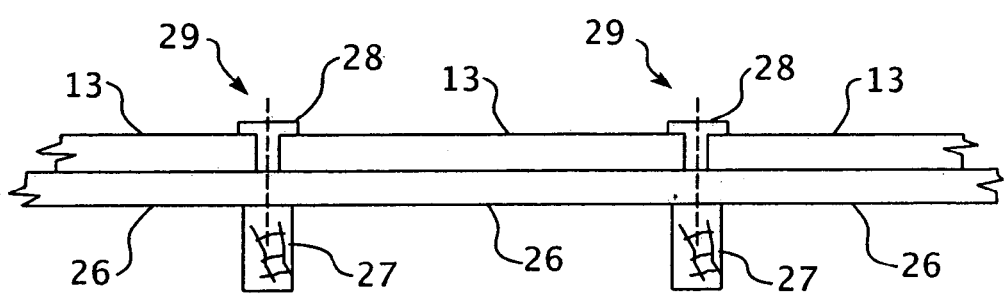
FIG. 5 is a sectional elevation along lines AA in FIG. 2 illustrating the interconnection of adjoining heat exchanger panels along their sides and their fixing to the roofing frame.

As is best seen in FIG. 5 which is a sectional elevation along lines AA in FIG. 2 illustrating the interconnection of adjoining heat exchanger panels along their sides and their fixing to the roofing frame, panels 13 are supported on roofing battens 26. Battens 26 are mounted transversely of roof rafters 27 (or the top chord of roof trusses) in known manner. Panels 13 are positioned with their lateral sides above rafters 27 and joined along their sides by lateral joining strips 28. The panels are fixed to rafters 27 and/or battens 26 by nails 29 through joining strips 28.

Figure 6:
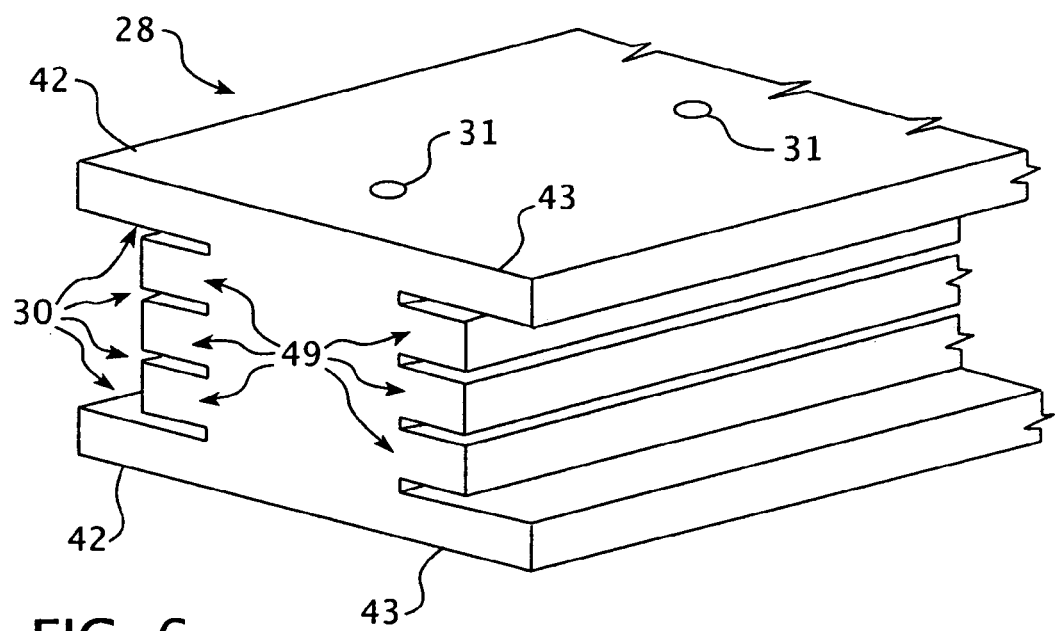
FIG. 6 is a perspective view of the lateral connector illustrated in FIG. 5.
Figure 7:
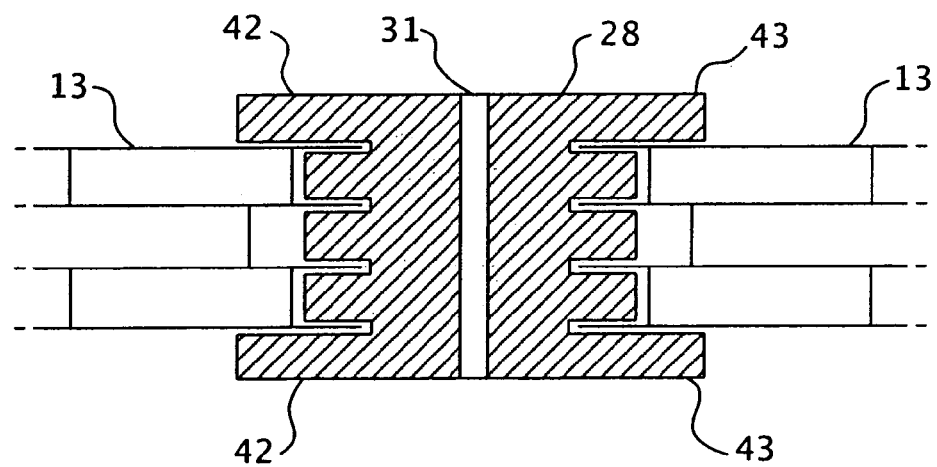
FIG. 7 is a sectional elevation illustrating in detail the interconnection of adjoining heat exchanger panels along their sides.

As is seen in more detail in FIGS. 6 and 7, lateral joining strips 28 have a plurality of laterally disposed, outwardly directed and longitudinally extending ribs 49 separated by inwardly directed grooves or slots 30, and a pair of opposed flanges 42 and 43. A plurality of apertures 31 extend along the length of strip 28 for receiving nails 29. In use, the lateral edges of sheets 16, 17, 20 and 21 extending beyond the outermost spacing ribs 18, 22 and 24 are adapted to be closely received in grooves 30 with flanges 42 and 43 being closely received above and below adjoining panels to provide a weatherproof seal along the lateral sides of the panels.

Joining strips 28 can be made from suitable plastic, rubberised material, fibreglass, aluminium or rolled steel. Suitable mastic sealers can also be used to improve weatherproofing.

Alternatively in an embodiment not illustrated, the joining strips can be replaced by providing a longitudinally extending female socket arrangement along one side edge adapted to closely receive the other side of the adjoining sheet in the manner of tongue and groove attachment.

Figure 8:
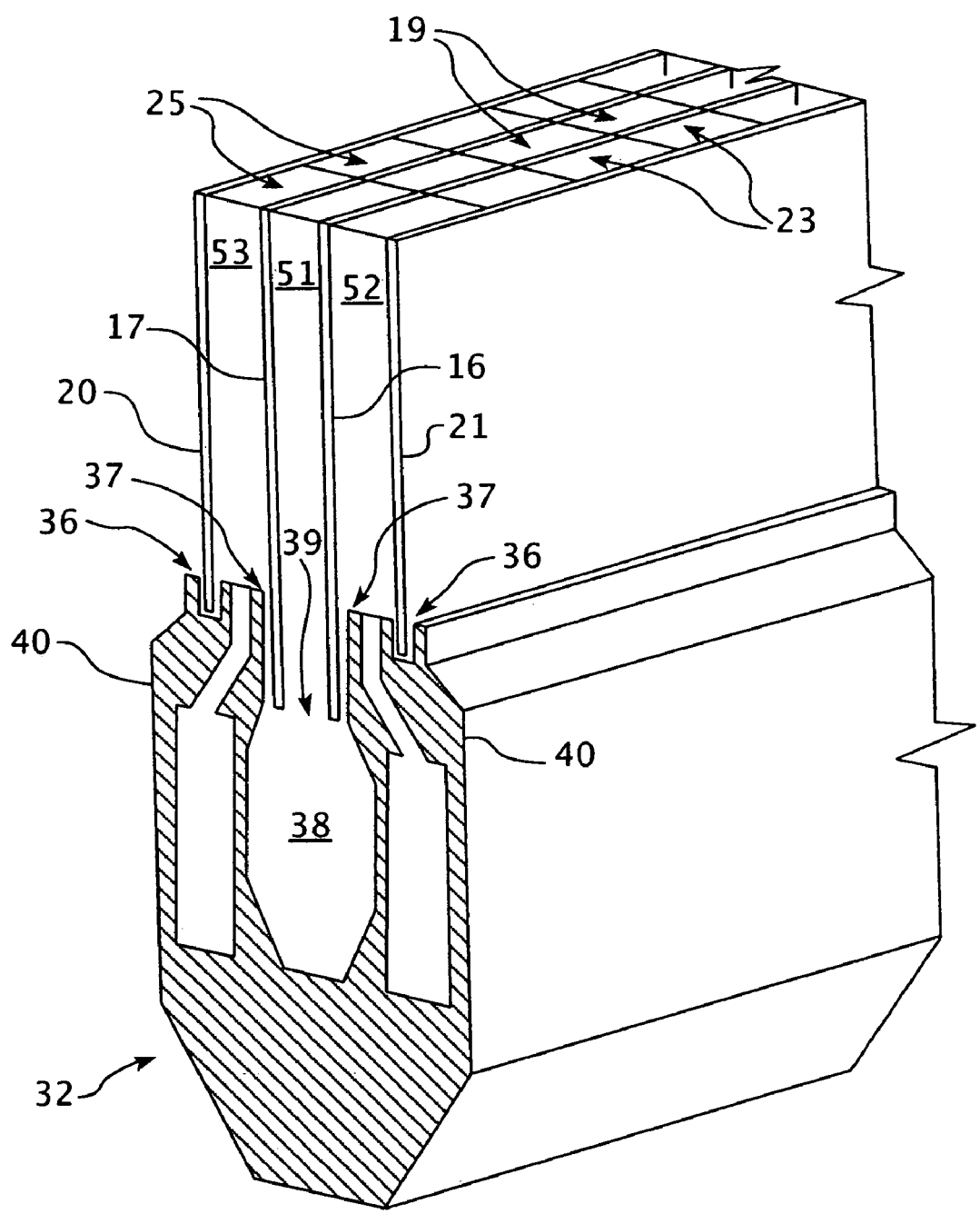
FIG. 8 is a sectional elevation illustrating a manifold for the supply of fluid and gas to the heat exchange panel connected to a panel.
Figure 9:
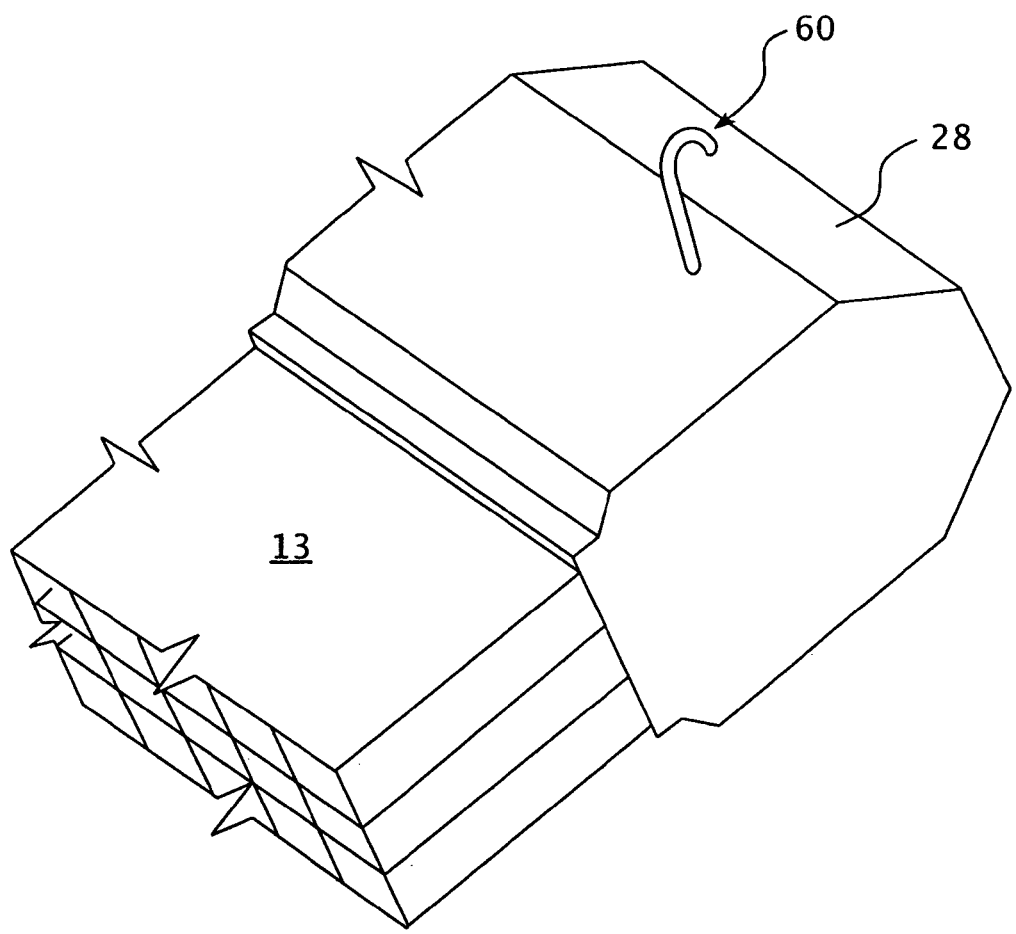
FIG. 9 illustrates a riser for relieving the pressure in the fluid passageway.

As is best seen in FIGS. 8 and 9, connection of fluid and gas supplies to panels 13 is effected by a manifold 32 attached to the panel ends 54 and 55. Manifold 32 is a longitudinally extending extrusion having fluid communication means in the form of a central channel 38 for the inflow or outflow of fluid to or from fluid conduits 19, and gas communication means in the form of a pair of channels 34 and 35 for the inflow or outflow of gas to or from external conduits 23 and 25 respectively. Manifold 28 includes receiving means in the form of a central opening 39 to central channel 38 for receiving internal sheets 16 and 17, and receiving means in the form of slots 36 for receiving external sheets 20 and 21 whereby the fluid communication means 38 and the gas communication means 34 and 35 are sealingly connected to the fluid passageway and the external passageways respectively.

Channels 34 and 35 communicate with the external passageways and external conduits 23 and 25 via longitudinally extending slots 40 in longitudinally extending ribs 37 on either side of central opening 39. Ribs 37 are closely received in external passageways 52 and 53 at the ends 54 and 55 of panel 13.

It will be seen that the ends of interior panels 16,17 extend beyond the ends of external panels 20,21 thereby facilitating ultrasonic or other fusion welding of manifold 32 to the interior panels 20,21. This provides a better seal to the internal passageways than is obtained by adhesive bonds and the like.

The fluid or gas supply is connected to manifold 32 by means of a ported cap (not illustrated) which fits closely over one end of the manifold and has connection flanges for connecting gas and/or water lines to the manifold. A blind cap seals the other end of the manifold.

The manifold can be of a standard length corresponding to the width of a heat exchanger panel. Alternatively the manifold can be of variable length which is cut to a required length to suit individual installations with one manifold extending across a number of adjoining panels.

As with joining strips 28, manifolds 32 can be made from suitable plastic, rubberised material, fibreglass, aluminium or rolled steel. Suitable mastic sealers can also be used to improve the seal between the manifold and the ends of the panel.

In use, a method of heat exchange in accordance with the present invention is effected by passing fluid through internal fluid passageway 51 formed between internal sheets 16 and 17, whereby heat is exchanged between the fluid and gas in external passageways 52 and 53 formed between internal sheet 16 and 17 and a respective external sheet 21 and 20.

As can be seen in FIG. 9, a riser 60 extends from the uppermost manifold 32 and vents to atmosphere to provide a pressure relief mechanism in the fluid passageway to relieve excess pressures which may be generated during heating of the fluid. Riser 60 comprises a U-tube which communicates with central fluid channel 38 in the manifold. A ball valve or the like (not shown) can be included in the down stream leg of the U-tube.

It will be appreciated that the heat exchange panel of the present invention has a number of advantages of known systems.

The external passageways of the present invention provide a layer between the fluid passageway and the ambient conditions and depending on the gas therein improves the efficiency of absorption of solar radiation or, in providing an insulating layer can improve the effectiveness of retention of heat generated by solar radiation.

The multiple passageway construction allows the cooling and heating properties of gases such as free air and inert gases to be exploited. The gas carrying external passageways moreover enable the heat exchanger assembly of the present invention to function in conditions where solar radiation is minimal or non-existent.

The venting of the panels ensures that the operating pressure within the fluid circuit is consistent with atmospheric pressure thereby avoiding pressure induced failure of the panel.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A roofing panel incorporating a heat exchange assembly, said roofing panel including:
   an internal fluid passageway formed between a pair of spaced substantially parallel internal sheets for the passage therethrough of a fluid;
   respective external passageways formed between each said internal sheet and a respective external sheet spaced from and substantially parallel to a respective internal sheet,
   spacing ribs between said sheets and forming with said sheets a plurality of fluid conduits within said internal fluid passageway and a plurality of external conduits within said external passageways;
   said pair of internal sheets at the ends of said internal passageway extending beyond said external sheets at the ends of said external passageways thereby facilitating fusion welding to said internal sheets at the ends of said internal passageway, said panel being sealed at the sides thereof by said spacing ribs and being open at the ends thereof to provide access to said conduits which extend from one end of the panel to the other end thereof, and said internal passageway or said external passageways being adapted to receive or contain a gas for effecting heat exchange with a fluid in the other of said internal passageway or said external passageways; and at least one manifold having a fluid communication means for the inflow or outflow of a fluid to or from said fluid conduits, and a gas communication means for the inflow or outflow of a gas to or from the external conduits.

2. A roofing panel as claimed in claim 1 wherein said manifold includes:

a receiving means for receiving the internal sheets and the external sheets whereby said fluid communication means and said gas communication means are sealingly connected to the fluid passageway and the external passageways respectively.

3. A roofing panel as claimed in claim 1, wherein said manifold is an extrusion and said fluid communication means and said gas communication means are channels in said extrusion.

* * * * *